United States Patent Office 2,722,481
Patented Nov. 1, 1955

2,722,481

HYDROMETALLURGICAL PROCESS FOR EXTRACTING METALS FROM OXIDE OR CARBONATE ORES

James H. Werntz, Wilmington, Del., assignor to E. I. du Pont de Nemours and Company, Wilmington, Del., a corporation of Delaware No Drawing. Application January 19, 1951,
Serial No. 206,925

6 Claims. (Cl. 75—120)

This invention relates to a new process for the separation of metals. More particularly, it relates to a new process for separating certain heavy metals from mineral mixtures or ores containing them in combined form.

The principal processes for the extraction of metals from ores or other mineral mixtures include reduction of metallic oxides with hydrogen or carbon, or treatment with acidic solutions followed by various separation treatments, e. g., electrolysis. In general, the known metal extraction processes involve high temperature treatments and/or the use of corrosive and non-recoverable extraction liquids. Furthermore, carbonates, oxides, etc., of the heavy metals are not recovered readily by methods that are applicable to sulfides, the compounds in which most of the non-ferrous metals occur. Moreover, many of the known methods are wholly or mostly inapplicable to low-grade ores, which are therefore discarded with consequent loss of valuable metals.

This invention has as an object a wet process for metal extraction which does not require elevated temperatures, the use of corrosive solutions, or, necessarily, preliminary separation of the ore from the gangue and other extraneous material. A further object is a process employing an extracting agent which is readily recoverable and reusable. Another object is a process applicable to low-grade ores ineffectively or uneconomically worked by other methods. Other objects will appear hereinafter.

These objects are accomplished by the present invention of a process for separating metals of groups I–B, II–B and IV–B of the periodic table and of atomic number between 29 and 82, inclusive, from mineral mixtures containing them in the form of oxides (including hydrated oxides) or carbonates, which comprises treating the mixture with an aqueous solution of a maleic anhydride/diketene copolymer, whereby the metal compound is solubilized, separating the aqueous solution from the undissolved residue, and regenerating the metal as its water-insoluble sulfide by treating said aqueous solution with hydrogen sulfide, an alkali metal sulfide, or ammonium sulfide, whereby the maleic anhydride/diketene copolymer is regenerated at the same time.

The maleic anhydride/diketene copolymers suitable for use in the process of this invention are those described and claimed in application Ser. No. 122,839, filed on October 21, 1949, by D. D. Coffman. As is known, diketene has the structural formula

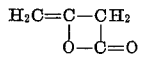

Its preparation is described on pages 127–135 in vol. III of "Organic Reactions," John Wiley and Sons, Inc. (1946). It is more properly called beta-methylene-beta-propiolactone, but it will be referred to herein, for the sake of brevity, by its more common name, diketene.

Diketene forms, with maleic anhydride with the aid of free radical type polymerization catalysts, copolymers which contain the two components in the mole ratio of 1:1 or approximately so. Physical and chemical evidence indicates that these copolymers contain the beta-propiolactone ring

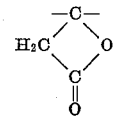

It is believed, although the evidence is not conclusive, that the copolymer is at least partially hydrated, with opening of the anhydride ring, in water. Its aqueous solution at room temperature has a pH of 1.3. For the sake of completeness, a description of the preparation of a typical copolymer follows:

A solution of 49.0 parts of maleic anhydride, 42.0 parts of diketene and 1 part of alpha,alpha'-azodiisobutyronitrile catalyst in 260 parts of benzene was heated to reflux with stirring. A polymeric product began to precipitate as soon as the temperature approached the reflux temperature of the solution. After heating for nine hours at 80° C. the reaction mixture was filtered. After filtering, washing with benzene and drying, there was obtained 68.7 parts of maleic anhydride/diketene copolymer as a white powder soluble in water, alcohol, dioxane, acetone and many other common organic solvents, and softening on a metal block at a temperature of approximately 140° C. This copolymer had an inherent viscosity of about 0.1 for a 0.5% solution in water and a kinematic viscosity of 4.3 centistokes for a 15% solution in methyl ethyl ketone. It has been observed that the inherent viscosity and composition of the maleic anhydride/diketene copolymers are substantially independent of the conditions of preparation such as relative proportion of monomers and amount of catalyst. In all cases the copolymer contains the maleic anhydride and the diketene in the mole ratio of 1:1 or very nearly so and the inherent viscosity at 25° C. is less than 0.3 for a 0.5 per cent solution in water.

The concentration of the maleic anhydride/diketene copolymer in the aqueous solution used to extract the mineral mixture is not critical; it may vary, for example, from 1% to 50% of copolymer based on the weight of the water, a generally useful range being 5–25%. It is only necessary to use as much copolymer as is needed to combine with the extractable metals, although in practice it is desirable to use an excess. In general, it will be found convenient to use between one mole and four moles of the copolymer (that is, one to four times the combined molecular weights of maleic anhydride and diketene) per atom of the total metals to be extracted.

It is noteworthy that the solubilizing action of the maleic anhydride-diketene copolymer appears to be specific to this compound. Polymeric materials which are related to it in the sense that they contain a plurality of carboxylic acid groups, or groups hydrolyzable thereto, are either insoluble in water or, if they are soluble, the solutions do not dissolve representative compounds such as zinc oxide. Examples of such polymers are polymethacrylic acid, styrene/maleic anhydride copolymer, vinyl acetate/maleic anhydride copolymer and carboxymethyl cellulose. Even a monomeric hydroxy acid such as tartaric acid does not dissolve zinc oxide.

The periodic table referred to herein is that found in many textbooks, such as Ephraim's "Inorganic Chemistry," fifth edition, Interscience Publishers, Inc., 1949.

In the preferred practice of this invention, the ore to be extracted is first finely divided, for example down to a particle size such that the particles pass a 16-mesh sieve. It is not necessary to separate the gangue and other extraneous material first, although this can be done if desired. The crushed ore is then extracted with a 5–25% aqueous solution of maleic anhydride/diketene copolymer between 0° C. and the boiling point of the solution, a preferred temperature range being 20–100° C., for a time sufficient to allow the metallic oxides and/or carbonates to dissolve, and the aqueous solution is separated by filtration from the undissolved material. This treatment solubilizes the oxides and carbonates and in some cases the halides (if any are present) of metals of atomic number 29–82 inclusive, in groups I–B, II–B and IV–B. It leaves as insoluble residue such compounds as the silicates, sulfides, sulfates, etc., of those metals, and also water-insoluble compounds of metals of atomic number below 29, such as calcium carbonate, aluminum silicate, etc. The extraction process may be repeated one or more times if necessary. The aqueous solution, which contains the extractable metals combined with the maleic anhydride/diketene copolymer, is then treated with hydrogen sulfide, or with ammonium sulfide or an alkali metal sulfide such as potassium or sodium sulfide. This treatment precipitates the metal as the water-insoluble sulfide, which is isolated and treated in an appropriate manner to regenerate the free metal, or metallic salts if desired. At the same time, the maleic anhydride/diketene copolymer which was bound with the metal is regenerated and the aqueous solution can be reused after the excess hydrogen sulfide has been removed, for example, by aeration or partial evaporation. If an alkali metal sulfide is used instead of hydrogen sulfide, the aqueous solution may be neutralized by controlled addition of acid to liberate the copolymers (as such or in hydrolyzed form) and hydrogen sulfide.

The invention is illustrated in greater detail by the following example in which parts are by weight.

EXAMPLE

A zinc-bearing ore was subjected to an extraction treatment as described below. The ore was the waste product of a zinc refining process; in other words, an ore which had been treated for removal of zinc but still contained a large amount of zinc not removed by the process used. The zinc in this ore was present as zinc oxide, zinc sulfate, and zinc ferrate. The ore had the following percentage composition as determined analytically.

*Electrolytic plant residue*

(Average values)

| | |
|---|---|
| Zn | 34 |
| Pb | 2 |
| Fe | 20 |
| Cu | 1 |
| CaO | 1 |
| MgO | -- |
| S | -- |
| $CO_2$ | -- |
| Insoluble | 10 |

The ore was ground to pass a 16-mesh screen, then air dried at 120° C. Ten parts of the ore was added to a solution of 27 parts of maleic anhydride/diketene copolymer in 120 parts of water, and the slurry was stirred for two hours at 25°–43° C. and three hours at 80° C. The reaction mixture was cooled to 25° C. and filtered. The filtrate, which had a pH of 2.5, was treated with hydrogen sulfide until no more precipitate formed. The precipitate, which consisted of a mixture of sulfides of the extracted materials, was filtered off and washed with water until free of hydrogen sulfide and of maleic anhydride/diketene copolymer and dried at 150° C. for about four hours. The precipitate, which weighed 3.3 parts was analyzed polarographically, for zinc and lead.

The table below shows the amount of ore extracted, the amount of zinc and lead present in the ore sample before extraction, the amount of zinc and lead removed from the ore sample by the extraction, and the percentage of the total zinc and lead extracted.

| Ore Sample, Parts | Metal Present In Ore, Parts | | Metal Extracted, Parts | | Total Metal Extracted, Percent | |
|---|---|---|---|---|---|---|
| | Zinc | Lead | Zinc | Lead | Zinc | Lead |
| 10 | 3.4 | 0.2 | 1.6 | 0.17 | 47 | 85 |

The feasibility of using an aqueous solution of the maleic anhydride/diketene copolymer in a recycling process was demonstrated by the following experiment. The filtrate from the above extraction, which contained the regenerated maleic anhydride/diketene copolymer and hydrogen sulfide, was aerated to remove the hydrogen sulfide and then used to extract 10 parts of a fresh sample of the same ore. The slurry was stirred for two hours at 25° C. and three hours at 80° C., then filtered, and the filtrate treated with hydrogen sulfide as previously described. The precipitate of sulfides of the extracted metals was filtered off, washed, and dried as above. The precipitate, which weighed 2.4 parts, was analyzed for zinc, copper, and lead. The table below shows the amount of ore extracted, the amount of zinc, lead, and copper present in the ore sample before extraction, the amount of zinc, lead, and copper removed from the ore sample by the extraction, and the percentage of the total zinc, lead, and copper extracted.

| Ore Sample, Parts | Metal Present In Ore, Parts | | | Metal Extracted, Parts | | | Total Metal Extracted, Percent | | |
|---|---|---|---|---|---|---|---|---|---|
| | Zinc | Lead | Copper | Zinc | Lead | Copper | Zinc | Lead | Copper |
| 10 | 3.4 | 0.2 | 0.1 | 1.06 | 0.06 | 0.02 | 31 | 29 | 20 |

While this invention has been illustrated with specific reference to the extraction of zinc, lead, and copper from an ore, it is generally applicable to the treatment of mineral mixtures, including ores, containing metals of groups I–B, II–B and IV–B of the periodic table and of atomic number between 29 and 82, inclusive, in the form of oxides (including the hydrated oxides, i. e., hydroxides) and carbonates, such metals being exemplified by copper, zinc, silver, cadmium, tin, mercury and lead. Thus, the process is applicable to such natural ores, as for example, zincite ($ZnO$), smithsonite ($ZnCO_3$), hydrozincite $$(ZnCO_3,Zn[OH]_2)$$

aurichalcite ($2[Zn.Cu]CO_3.3[Zn.Cu][OH]_2$), calamine ($2ZnO.SiO_2.H_2O$), cerussite ($PbCO_3$), leadhillite $$(Pb[OH]_2.PbSO_4.PbCO_3.)$$

matlockite ($PbO.PbCl_2$), massicot ($PbO$), azurite ($2CuCO_3.Cu[OH]_2$), cuprite ($Cu_2O$), atacamite $$(CuCl_2.3Cu[OH]_2)$$

malachite ($CuCO_3.Cu[OH]_2$), brochantite $$(CuSO_4.3Cu[OH]_2)$$

cassiterite ($SnO_2$), montroydite ($HgO$), argentojarosite ($Ag_2Fe_6[OH]_{12}(SO_4)_4$), cadmium oxide and the like. The invention is also applicable to processed ores, that is, ores that have been oxidized to oxides by known metallurgical methods. For example, lead sulfide (galena) can first be roasted to the oxide, then subjected to extraction with maleic anhydride/diketene copolymer. It is also applicable to materials or mixtures of materials not naturally occurring but containing extractable metals, such as pigments, or mixtures of various metal salts formed in other industrial processes.

It will be apparent that the effectiveness of this process depends on the selective solubilizing action of the maleic anhydride/diketene copolymer on metal compounds, which permits the ready separation of the oxides (including hydrated oxides) or carbonates of metals of atomic number 29 to 82, inclusive, in groups I–B, II–B and IV–B, from a number of other constituents, e. g., alumina, iron oxide, aluminum silicate, limestone, barium carbonate, quartz, fluorspar, calcite, feldspar and other silicates, and other metals, metallic sulfides, arsenides, antimonides and sulfosalts with which they may be associated in ores. This method will separate these compounds also from a variety of compounds occurring in nature in which the metal belongs to other groups than those listed. Viewed broadly, therefore, the invention is a process for separating the specified metals whereby the oxides and carbonates of said metals are dissolved in an aqueous solution of a maleic anhydride/diketene copolymer and said aqueous solution is separated from the insoluble residue. In general, it is convenient to recover the metal from said solution as the sulfide, but it can be recovered in the form of other salts if desired, such as the chloride or sulfate, by treatment with the appropriate acid or water-soluble salt thereof.

The term "oxide" used herein includes also the hydrated oxides.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the extraction of zinc values from a mineral mixture containing the same as a compound of the class consisting of oxide and carbonate in mixture with other mineral components which comprises extracting the finely divided mineral mixture with an aqueous solution of a maleic anhydride/diketene copolymer.

2. A process for the extraction of lead values from a mineral mixture containing the same as a compound of the class consisting of oxide and carbonate in mixture with other mineral components which comprises extracting the finely divided mineral mixture with an aqueous solution of a maleic anhydride/diketene copolymer.

3. A process for the extraction of copper values from a mineral mixture containing the same as a compound of the class consisting of oxide and carbonate in mixture with other mineral components which comprises extracting the finely divided mineral mixture with an aqueous solution of a maleic anhydride/diketene copolymer.

4. A process for the extraction of metal values of metals of atomic number between 29 and 82 in groups I–B, II–B and IV–B from a mineral mixture containing the same as a compound of the class consisting of oxide and carbonate in mixture with other mineral components which comprises extracting the finely divided mineral mixture with an aqueous solution of maleic anhydride/diketene copolymer.

5. A process for the recovery of zinc values from a mineral mixture containing the same as a compound of the class consisting of oxide and carbonate in mixture with other mineral components which comprises extracting the finely divided mineral mixture with an aqueous solution of a maleic anhydride/diketene copolymer and separating the metal values from the aqueous extract.

6. A process for the recovery of zinc values from a mineral mixture containing the same as a compound of the class consisting of oxide and carbonate in mixture with other mineral components which comprises extracting the finely divided mineral mixture with an aqueous solution of a maleic anhydride/diketene copolymer and treating the aqueous extract to recover the metal values.

References Cited in the file of this patent

UNITED STATES PATENTS

| | | |
|---|---|---|
| 2,474,839 | Gresham et al. | July 5, 1949 |
| 2,483,960 | Baer et al. | Oct. 4, 1949 |